Patented Sept. 8, 1925.

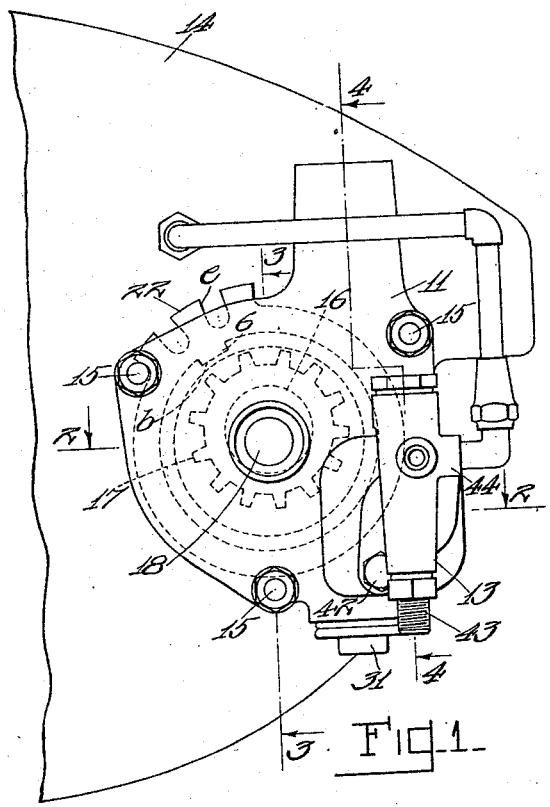

1,553,225

UNITED STATES PATENT OFFICE.

STEPHEN I. FEKETE AND STUART G. BAITS, OF DETROIT, MICHIGAN, ASSIGNORS TO HUDSON MOTOR CAR COMPANY, OF DETROIT, MICHIGAN, A CORPORATION OF MICHIGAN.

DISTRIBUTOR DRIVE UNIT.

Application filed August 4, 1923. Serial No. 655,758.

*To all whom it may concern:*

Be it known that we, STEPHEN I. FEKETE and STUART G. BAITS, citizens of the United States, residing at Detroit, county of Wayne, and State of Michigan, have invented a certain new and useful Improvement in Distributor Drive Units, of which the following is a specification, reference being had therein to the accompanying drawings.

The present invention has for its object a unit which will comprise a sprocket for the chain drive for the cam shaft, a tightening device for the chain, a driving shaft for the distributor and interrupter of the ignition system, an oil pump for the lubricating system of the engine, and a driving shaft for the generator. Heretofore, some or all of these parts have been separate from each other and each has had its own driving mechanism. This has added to the weight and cost of the vehicle and has increased the danger of trouble to the user. When the vehicle has been assembled by so-called chain assembly methods, the work has been delayed by the large number of small parts in these devices, and therefore the total expense has been unnecessarily increased. Accordingly, the particular object of the present invention is to provide a single unit containing the above mentioned devices, housed in a single casing so that the weight of materials and the expense thereof will be reduced. By the combination and construction hereinafter described, duplication of parts is avoided, a more positive compact and reliable structure is produced, and the whole can be assembled independently of the chassis under the best possible conditions, the unit as a whole being put in place in the chassis while the vehicle is being put together on the assembly chain.

The present invention reduces the total cost of the vehicle materially, and also makes possible the substitution of one unit for another in case anything goes wrong with the first unit.

There is also shown in the drawings of the present application a novel lubricating system for the moving parts contained within the unit comprising the present invention, but the lubricating system is not claimed herein as it comprises the subject matter of our joint application, filed August 4, 1923, Serial No. 655,759.

The invention will be fully understood from the following description when taken in connection with the accompanying drawings, and the novel features thereof will be pointed out and clearly defined in the claims at the close of this specification.

In the drawings:

Fig. 1 is a rear elevation of a unit embodying the present invention.

Fig. 2 is a horizontal section on line 2—2, Fig. 1.

Fig. 3 is a vertical section on line 3—3, Fig. 1.

Fig. 4 is a vertical section through the main and pump casings taken on line 4—4, Fig. 1.

Fig. 5 is a detail of the eccentric bearing.

Referring now to the drawings, the casing of the unit is composed of two pieces, the main casing 11 and the oil pump body 13. The main casing 11 is secured to the front motor support plate 14 by bolts 15. This motor support plate takes the place of the motor legs in the engine with which the unit embodying the present invention is intended to be used. At 16 is shown an eccentric bearing for the sprocket 17 over which the timing chain (not shown) runs. Arranged axially inside the eccentric bearing 16 is a generator shaft 18 having on its outer end a cap 19 provided with lugs 20 which engage with notches 21 in the forward face of a piece 50, called for convenience a cross-member. The rear face of this cross-member is notched at 51 to engage lugs 52 on the front face of the sprocket 17. The cap 19 with its lugs 20, together with the cross-member 50 and the sprocket 17 provided with lugs, form an Oldham joint between the sprocket 17 and the shaft 18, so that the axis of the sprocket 17 may be adjusted to tighten the timing chain without interfering with the freedom of movement of the parts.

The eccentric bearing 16 (see also Figure 5) has a flange $a$ having a notch $b$. An adjusting collar 22 having a projection 6 fits around the flange with the projection 6 in the notch $b$. The collar is also notched on its outer periphery as shown at $e$ to receive one of the bolts or cap screws 15 previously referred to by which it and the eccentric bearing can be secured in different positions of adjustment.

The portion of the shaft 18 at the rear of the eccentric bearing 16 is provided with a spiral gear 25 and extends rearwardly through an opening 26 in casing 11 for connection with the generator and water pump, neither of which is shown.

At 27 is shown a spiral gear meshing with the gear 25 and fixed on a vertical distributor drive shaft 28. The upper end of the distributor drive shaft 28 revolves in a bushing 29 in a web in the main casing 11, and is forked as shown at c for connection to the shaft of the distributor and interrupter, neither of which are shown. The lower end of the distributor drive shaft 28 revolves in a lower bushing 30 and is enclosed by a cap 31. The shaft 28 also carries a worm 32 formed integral with the sleeve or hub of the spiral gear 27. The lower face of the hub of the worm 32 rests on the upper face of the lower bushing and thereby positions the distributor drive shaft vertically.

Meshing with the worm 32 is a gear 34 formed integral with a horizontal oil pump shaft 35, which also carries an eccentric 36. The oil pump shaft is supported at its inner end in a web 37 in the main casing and on its outer end in a bushing 38. The eccentric 36 actuates in one direction the plunger 39 of the oil pump, the body or casing of which has already been referred to and is designated 13. The plunger of the oil pump is moved in the reverse direction by a spring 41. The oil pump body 13 is secured to the main casing by cap screws 42, and is connected to the oil leads as shown at 43 and 44. It also contains the necessary valves which in the form shown in the drawings are balls 45 and 46.

In assembling the parts, the generator shaft 18, eccentric bearing 16, and parts forming the Oldham joint are assembled. The several parts in the casing 11 are put together. Then the assembly containing the eccentric bearing is inserted through the hole in the motor leg 14, and the adjusting collar 22 is put on with the projection 6 in the notch b. Then the casing is put in place and secured by the bolts 15, which when tightened hold the parts securely in place. The adjustment of the eccentric bearing 16 to tighten the timing chain is easily accomplished by changing the position of the adjusting collar as required.

What we claim is:

1. The unit including a casing, a plunger oil pump, a horizontal generator shaft, a sprocket to rotate said shaft, a vertical distributor shaft, a horizontal oil pump shaft located at a level different from that of the generator shaft, and gearing on said shaft connecting the generator shaft and the distributor shaft, and the distributor shaft and the oil pump shaft, the parts being supported and enclosed by the casing.

2. The unit including a casing, a plunger oil pump, a horizontal generator shaft, an eccentric bearing therefor, a sprocket running on said eccentric bearing, an Oldham joint connecting the shaft and the sprocket, a vertical distributor shaft, gearing connecting said shafts, a horizontal oil pump shaft, gearing connecting the oil pump shaft and the distributor shaft, the parts being supported and enclosed by the casing.

3. The unit comprising a casing, a distributor supported thereon, an eccentric bushing closing an opening in one side of the casing, a generator shaft passing through the casing and the eccentric bushing, a driving sprocket on the bearing and connected to the said shaft by an Oldham joint, an oil pump secured to the casing, a vertical distributor shaft geared to the generator shaft, a horizontal oil pump shaft at right angles to the generator shaft and geared to the distributor shaft, an eccentric on the oil pump shaft and a horizontal spring actuated plunger for the oil pump actuated by the eccentric.

In testimony whereof we affix our signatures.

STEPHEN I. FEKETE.
STUART G. BAITS.